(12) United States Patent
Allard

(10) Patent No.: US 7,278,458 B2
(45) Date of Patent: Oct. 9, 2007

(54) TIRE WITH A REINFORCED SIDEWALL AND FABRICATION PROCESS

(75) Inventor: Frédéric Allard, Mezel (FR)

(73) Assignee: Michelin Recherche et Technique, S.A., Granges-Paccot (CH)

( * ) Notice: Subject to any disclaimer, the term of this patent is extended or adjusted under 35 U.S.C. 154(b) by 11 days.

(21) Appl. No.: 11/210,649

(22) Filed: Aug. 24, 2005

(65) Prior Publication Data
US 2006/0054260 A1    Mar. 16, 2006

Related U.S. Application Data

(63) Continuation of application No. PCT/EP04/01910, filed on Feb. 26, 2004.

(30) Foreign Application Priority Data
Mar. 3, 2003    (FR) .................................. 03 02574

(51) Int. Cl.
B60C 13/00    (2006.01)
B60C 9/00    (2006.01)
B60C 15/00    (2006.01)
B60C 15/05    (2006.01)

(52) U.S. Cl. ...................... 152/555; 152/526; 152/539; 152/545; 152/546

(58) Field of Classification Search ............... 152/539, 152/540, 545, 546, 555, 541, 542, 543, 526, 152/531, 533
See application file for complete search history.

(56) References Cited

U.S. PATENT DOCUMENTS

| | | | |
|---|---|---|---|
| 1,548,370 A * | 8/1925 | Midgley ..................... 152/540 |
| 2,186,178 A | 1/1940 | Shoemaker | |
| 3,631,913 A | 1/1972 | Boilcau | |
| 4,029,137 A * | 6/1977 | Suydam ..................... 152/539 |
| 6,666,248 B2 * | 12/2003 | Omoto et al. ............... 152/523 |
| 6,834,694 B2 | 12/2004 | Muhlhoff | |
| 7,093,637 B2 * | 8/2006 | Burlacot ..................... 152/555 |

FOREIGN PATENT DOCUMENTS

| | | | |
|---|---|---|---|
| DE | 2357265 | * | 5/1975 |
| EP | 0 634 297 A | | 1/1995 |

(Continued)

*Primary Examiner*—Justin R. Fischer
(74) *Attorney, Agent, or Firm*—Cohen Pontani Lieberman & Pavane LLP

(57) ABSTRACT

A tire designed to be mounted on a mounting rim J of maximum diameter $D_c$ the type comprising beads designed to cooperate with seats of the mounting rim, the beads comprising at least one annular bead reinforcement structure; a crown comprising a reinforcement structure, this crown being surmounted radially on the outside by a tread; on either side of the tire's crown, a sidewall providing connection to each bead; a carcass reinforcement extending between the crown and the beads; wherein at least one sidewall comprises at least two additional annular reinforcement structures, each additional annular structure having an inner diameter at least equal to the maximum diameter $D_c$ of the rim; the carcass reinforcement is anchored at least partially on each annular bead reinforcement structure and on each additional annular sidewall reinforcement structure; the difference between the inner diameter of the radially innermost additional annular reinforcement structure in each sidewall and the diameter $D_j$ of the rim seat on the same side as the sidewall containing the annular structure is at least equal to 20% of the diameter $D_j$.

9 Claims, 4 Drawing Sheets

FOREIGN PATENT DOCUMENTS

| | | | |
|---|---|---|---|
| EP | 0 770 504 A | | 5/1997 |
| FR | 2 277 688 | | 2/1976 |
| JP | 59-84607 | * | 5/1984 |
| JP | 03 169726 A | | 10/1991 |
| JP | 2002178725 | * | 6/2002 |
| WO | WO 02/09955 | | 2/2002 |

* cited by examiner

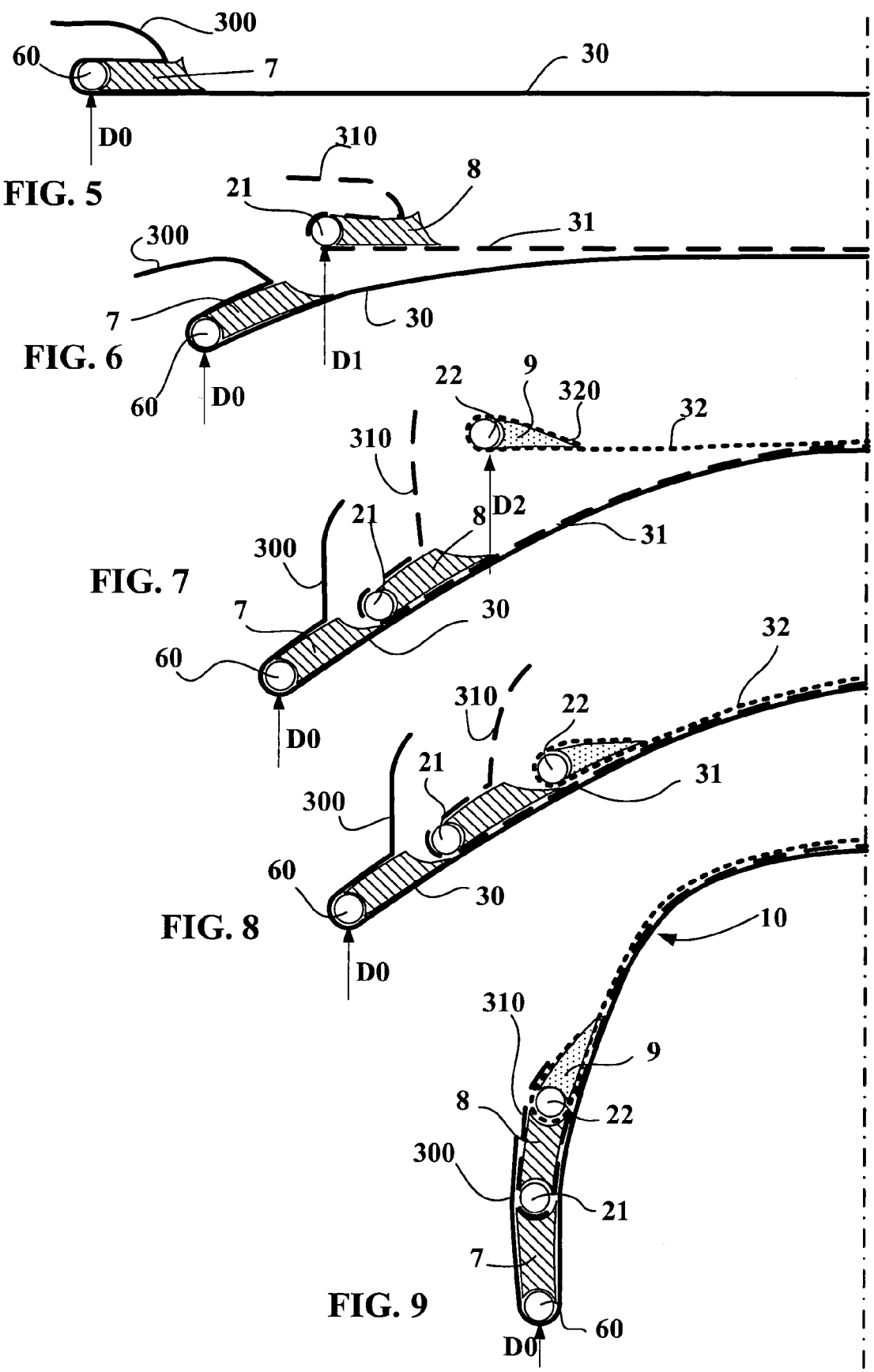

TIRE WITH A REINFORCED SIDEWALL AND FABRICATION PROCESS

This application is a U.S. Continuation Application under 35 USC 371 of International Application PCT/EP2004/001910 filed Feb. 26, 2004.

The present invention concerns tires and more particularly the reinforcement structure of the sidewalls of tires. It also concerns a process suitable for the manufacture of these tires.

It will be recalled that a tire, particularly one designed for fitting on a passenger car, comprises:
- tire beads designed to cooperate with a mounting rim of the tire, the said beads comprising at least one annular reinforcement structure;
- a crown comprising a reinforcement structure with a plurality of reinforcing elements such as cables or threads embedded in rubber mixes, this crown being surmounted radially on the outside by a tread whose function is to maintain contact with the road during rolling;
- on either side of the tire, a sidewall that provides connection with each bead.

In addition, a tire comprises a carcass reinforcement formed of a plurality of reinforcing elements (in particular cables or threads) embedded in a rubber mix, the said reinforcing elements being orientated in preferred directions. For example, the reinforcing elements of the carcass reinforcement, in the form of one or several layers, can be arranged so as to make an angle close or equal to 90° with the circumferential direction on the tire; other known possibilities consist in arranging these reinforcing elements in several carcass plies, the reinforcing elements in each ply being essentially parallel to one another and making an angle different from 90° with the circumferential direction, while being crossed relative to the reinforcing elements of each adjacent carcass ply. The reinforcing elements of the carcass reinforcement can be distributed within the tire without actually forming plies (or layers), for example being positioned individually or in a strip of several reinforcing elements parallel to one another within the said strip.

In general, the carcass reinforcement extends in the crown of the tire and in each sidewall, to be anchored on the annular reinforcement structure of each bead. One possibility consists in anchoring the carcass reinforcement formed of a carcass ply by partially wrapping it around the said annular structure.

In the case of tires with a speed index corresponding to very high maximum running speeds (for example exceeding 240 km/h), it has been proposed to use carcass reinforcements comprising several carcass plies, at least one of these plies being anchored by partial wrapping around an annular reinforcement structure to form an upturn and at least one of the carcass plies being anchored in the same bead by mechanical coupling onto the said upturn and then passing radially inside the annular reinforcement structure.

This last structure offers some advantage for such tires in that it confers greater rigidity on the sidewalls of the tires and gives appreciably better performance when cornering at high speed.

Another family of solutions consists in combining a carcass reinforcement with the presence of additional reinforcements of crossed elements in at least one sidewall.

U.S. Pat. No. 2,186,178, aiming to confer on the tire and more particularly one with a radial carcass reinforcement (i.e. one whose reinforcing elements make an angle equal or close to 90° with the circumferential direction) greater stability during rolling but without penalizing comfort, proposes to arrange at the junction between the bead and the sidewall of the tire an additional or secondary bead wire which serves to anchor additional reinforcement structures.

Patent FR 1 590 025 essentially adopts the same principle and improves it by including an adapted carcass reinforcement profiled element in the sidewall of the tire. When the tire is mounted on its service rim and inflated to its nominal pressure, the portion of the carcass reinforcement adjacent to the tread extends down to beyond the half-height of the sidewall while progressively moving away from the median plane and presenting a meridian profile with relatively small curvature, while the second portion, radially interposed between the first portion and the bead wire anchoring the carcass reinforcement, is of smaller radial height and has a relatively strongly curved meridian profile, the two portions described being joined by a second circumferential reinforcement in the form of a bead wire. The same principle of an additional bead wire located at the junction of the sidewall and bead is adopted by the patent DE 2 357 265.

Patent FR 2 277 688 proposes a structure which confers on the sidewalls greater resistance to the deformations undergone at high speed. According to that document a tire is proposed whose crown comprises an additional ply located between the carcass reinforcement and the crown plies, whose axial ends are folded around a circumferential ring of thread or cable.

In a patent application published under the number WO 02/09955, a tire has been proposed which achieves high performance by increasing the transverse and longitudinal rigidity of at least one of the sidewalls, based on the said principle of an additional reinforcement ring in at least one sidewall. Besides, this additional sidewall reinforcement ring located axially inside the carcass ply said to be axially outermost, is combined with the presence of a profiled element of rubber mix located radially between the said anchoring element in the bead and the said sidewall ring, and located axially inside the carcass ply said to be axially on the outside.

Although these various technical solutions result in a considerable improvement of performance at high speeds, it has been found that there is further need for improvement, in particular for tires whose form ratio is larger than 40% (the form ratio, denoted H/S, being equal to the ratio between the radial height of the tire's cross-section and the overall width of the tire, these dimensions being measured when the tire is mounted on its mounting rim and inflated to its nominal pressure as defined in the standard ETRTO).

To improve the performance of a tire at high speeds significantly (and inter alia to reduce as much as possible the deformations associated with such speeds that can appear in the sidewalls), and in particular but not exclusively that of a tire with form ratio H/S larger than or equal to 40%, a tire is proposed which is designed for fitting on a fitting rim of maximum diameter $D_c$, and which comprises:
- beads designed to cooperate with the mounting rim of the tire, the said beads comprising at least one annular reinforcement structure;
- a crown comprising a reinforcement structure having a plurality of reinforcing elements such as cables or threads embedded in rubber mixes, this crown being surmounted radially on the outside by a tread whose function is to maintain contact with the road during rolling;
- on either side of the tire's crown, a sidewall that provides connection with each bead;

a carcass reinforcement extending between the crown and the beads, and designed to balance the forces due to the inflation pressure and to transmit the forces to which the crown is subjected, to the rim via the beads;

this tire being characterized in that:
at least one sidewall comprises at least two additional annular reinforcement structures, each additional annular reinforcement structure having an inner diameter at least equal to the maximum diameter $D_c$ of the tire's mounting rim; and
the carcass reinforcement is anchored at least partially on each annular bead reinforcement structure and on each additional annular sidewall reinforcement structure so as to create a circumferential tension force in each annular structure when the tire is inflated.

"Maximum diameter $D_c$ of the mounting rim" is understood to mean the diameter of the circle on which are located the points of the rim radially furthest away from the rotation axis. For example, for an ordinary rim provided with rim flanges on its lateral edges, the diameter $D_c$ of the rim is the diameter of the circle passing through the radially outermost points of the said flanges.

"Annular structure" means a structure in the tire which is capable of supporting a circumferential tension force larger than the force that would be supported by the same volume of rubber mix. In particular an annular structure can be:
a bead wire of the plaited [US: braided] type formed of one or more threads or metallic cables or textile cords, or any of the usual types of bead anchoring structures;
a ring of metallic or plastic material with appropriate cross-section geometry;
a plurality of sections of filaments or cords connected together during the molding and vulcanization of the rubber mix that covers the said sections.

"Inner diameter of an additional annular structure" means the diameter of the circle passing through the radially innermost points of the said structure.

In a preferred variant the difference between the inner diameter of the radially innermost additional annular reinforcement structure of each sidewall and the diameter $D_j$ of the rim seat on the same side as the sidewall containing the said annular structure, is at least equal to 20% of the diameter $D_j$.

Preferably, the difference between the inner diameter of the radially outermost additional annular structure of each sidewall and the diameter $D_j$ of the rim seat on the same side as the sidewall containing the said annular structure is at most equal to 1.6 times the height H of the tire's cross-section measured on the same side.

In another preferred variant the adjacent additional annular structures in the same sidewall, taken two by two, are separated by a rubber profiled element whose height, measured in the radial direction, is at least equal to 15 mm in order to optimize the behavior of the tire in the presence of substantial lateral forces.

According to the invention, the carcass reinforcement can be anchored either entirely or only partially to any of the annular reinforcement structures in the bead or the sidewall.

Each additional annular reinforcement structure is designed to take up part of the total carcass tension when the tire is mounted on its rim and inflated to its working pressure. Thus, it has been found that a circumferential tension at least equal to 10% of the tension of the bead reinforcement structure was preferable.

In another preferred variant it is also possible to use in the same sidewall two additional structures of the same diameter, these structures being axially separated, with at least part of the carcass reinforcement anchored on at least one of the said additional structures.

Preferably, the sum of the circumferential forces taken up by the annular sidewall structures is at least equal to the circumferential force to which the bead reinforcement structure is subjected.

A person skilled in the art can determine the distribution of the circumferential forces in each of the annular reinforcement structures of the sidewall; however, it has been found, surprisingly, that it could be advantageous to arrange for the said forces to increase as the diameter of the annular sidewall reinforcement structure increases.

Preferably, each portion of carcass reinforcement anchored on each annular sidewall and bead reinforcement structure forms an upturn, each upturn of a portion of carcass reinforcement being mechanically coupled to at least one other portion of reinforcement anchored on an annular reinforcement structure of larger diameter.

Advantageously, in this last case, radially on the outside of each annular reinforcement structure a filling profiled element of rubber mix is provided, which has a Shore A hardness at least equal to 50 this profiled element providing a mechanical coupling between the portion of carcass reinforcement anchored on the said structure and the upturn of the said portion. Moreover, these profiled elements can have different natures and/or mechanical properties depending on their position in a given sidewall.

The combined presence of annular reinforcement structures and profiled elements of rubber mix having a Shore A hardness of at least 50 increases the resistance to transverse forces very substantially.

Preferably, when at least one reinforcement portion is turned up around an annular reinforcement structure, the upturn formed by the said portion is positioned axially outside at least the nearest annular reinforcement structure which is radially on the outside.

In another variant of the solution, each portion of carcass reinforcement is anchored by shear coupling to at least one annular reinforcement structure formed of inextensible reinforcing elements arranged in at least one stack in the radial direction on the tire. Preferably, in this variant each annular reinforcement structure consists of at least two stacks of essentially circumferential reinforcing elements, and the portion of carcass reinforcement anchored on each annular structure is positioned axially between two of the said stacks.

The present invention also concerns a fabrication process for a tire conforming to the description given above.

To fabricate a tire comprising, besides an annular, circumferential bead reinforcement structure, at least one additional annular sidewall structure, the process according to the invention comprises the following stages:
onto a radially deformable building drum is wrapped a first carcass portion which will ultimately constitute part of the carcass reinforcement;
an annular structure which is circumferentially undeformable and of inner diameter D0, combined with a profiled element of rubber mix, is positioned concentrically on the drum and radially outside the said first portion, to form an annular bead reinforcement structure;
an end of the said portion is anchored at least partially on each of these annular structures;
on a diameter larger than D0 another portion of the tire's carcass reinforcement is prepared and, concentrically with this second portion, an annular reinforcement structure of inner diameter D1 is positioned, D1 being larger than D0, so that the said second portion of carcass reinforcement can be anchored on these annular reinforcement structures;

the preceding operation is repeated as many times as necessary, i.e. as many times as there are annular reinforcement structures in the sidewall(s); then the portions of carcass reinforcement so constituted are positioned concentrically with one another and with increasing diameters of the annular reinforcement structures, to constitute a stack;

with the aid of known appropriate means, the stack so obtained is forced to assume a toroidal shape by expanding it radially and bringing nearer together transversely the annular reinforcement structures;

the fabrication of the tire is completed in the usual manner well known to the person skilled in the art.

This process gives great freedom in the arrangement of the various portions of carcass reinforcement, such that the desired tire is obtained. The various portions of carcass reinforcement may or may not be arranged symmetrically with respect to the median plane of the tire while they are all concentric with one another.

The process just described can have equivalent variants. In particular, the shaping operation can be carried out in one or more successive stages. For example, the different carcass reinforcement portions are made on different drums before being assembled concentrically with one another and then formed into toroidal shape. Another possibility is that after each formation of a carcass reinforcement portion, this portion is slightly shaped before another reinforcement portion is formed on the toroidal surface obtained, and so on.

In all these variants of the process according to the invention, the upturns of each carcass reinforcement portion around the annular reinforcement structures can be positioned either radially inside the said annular structures or radially outside the said structures.

The process described applies to the formation of a tire in which the carcass reinforcement is anchored not only in the beads but also to at least one other additional structure of diameter larger than that of the bead reinforcement structure.

This process enables excellent positioning of the various annular reinforcement structures relative to one another in the radial direction, so ensuring very good rolling uniformity by virtue of very good centering.

Other characteristics and advantages of the present invention will emerge from the description given below, which refers to the attached drawings in which:

FIGS. 5 to 9 show the stages of a fabrication process of a carcass reinforcement for a tire according to the invention comprising two annular reinforcement structures in each sidewall.

Figure 1:
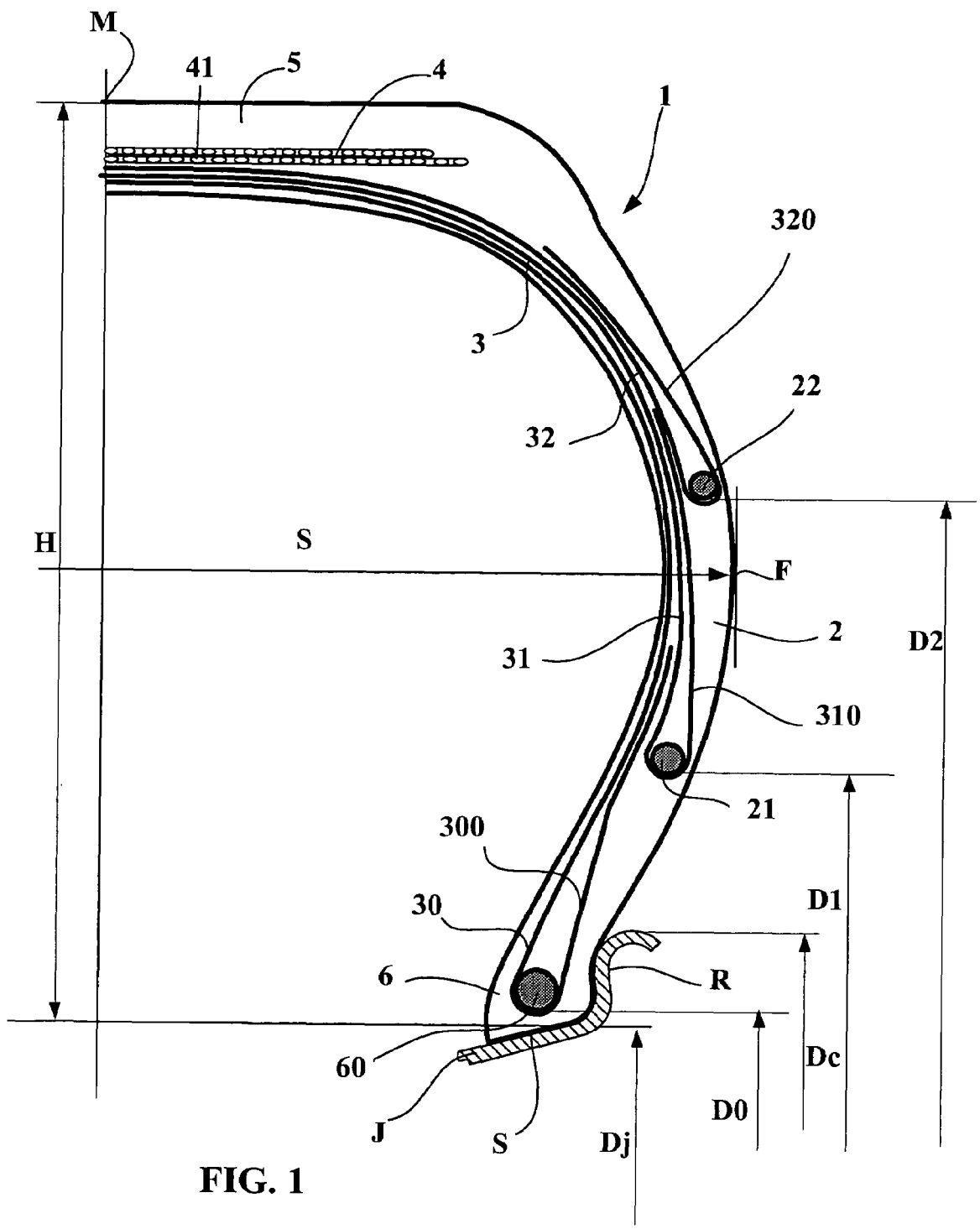
FIG. 1 represents a partial view of a radial cross-section of a tire according to the invention.
Figure 10:
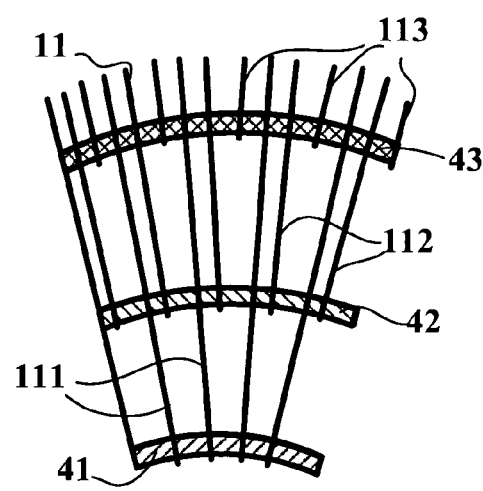

FIG. 10 represents a partial view of the sidewall of a tire according to the invention FIG. 1 shows a partial view of a cross-section of a tire 1 according to the invention, this tire being symmetrical and comprising two additional reinforcement structures 21, 22 of the sidewalls 2 around which portions of a carcass reinforcement 3 are anchored by turn-up. The tire 1 is mounted on its mounting rim J which comprises a rim seat S extended axially and radially outwards by a rim flange R whose radially outermost points lie on a circle of diameter $D_c$.

In this configuration the tire 1 has a section height H measured, in the section plane, between the nominal diameter $D_j$ of the rim (taken essentially at the intersection of the flange R and the rim seat S) and the radially outermost point M of the tread. The tire has a section width S measured between the sidewall points that are axially furthest apart. In the present case the tire has a form ratio equal to 0.70.

The tire 1 illustrated schematically comprises a part forming its crown 4, this part being reinforced by a crown reinforcement 41 and being provided radially on the outside with a tread 5 intended to come into contact with the road during rolling. Extending the crown 4 is the sidewall 2 which ends at its radially inner end in a bead 6 designed to be in contact with the mounting rim J of the tire.

In addition, to balance the forces due to the tire's internal inflation pressure, the said tire comprises a reinforcement known as the carcass reinforcement 3 which extends from the crown to the beads, passing through the sidewalls.

A first portion 30 of the carcass reinforcement is anchored around an annular bead 6 reinforcement structure 60 (in the form of a metallic bead wire), passing axially from inside the tire towards the outside to form an upturn 300. The inner diameter D0 of this bead wire 60 is smaller than the outer diameter of the rim flange R (which corresponds in the present case to the maximum diameter $D_c$ of the rim) so as to ensure that the bead is held in place on the mounting rim.

A second portion 31 of the same carcass reinforcement extends throughout the crown and partially in the sidewall until it is wrapped around an additional annular reinforcement structure 21, passing axially from inside the tire towards the outside to form an upturn 310. Here, the additional annular structure 21 is a metallic wire of cross-section smaller than that of the bead wire 60 and of inner diameter D1. This diameter is larger than the outer diameter $D_c$ of the rim flange R; the difference between the inner diameter D1 and the diameter $D_j$ of the rim seat is larger than 20% of the diameter $D_j$.

A third and last portion 32 of the same carcass reinforcement extends throughout the crown and partially in the sidewall until it is wrapped around a second additional annular reinforcement structure 22, passing axially from inside the tire towards the outside to form an upturn 320. The second additional annular structure 22 is in this case a metallic wire identical to the first additional annular structure 21 but of inner diameter D2 which, in the present case, is such that the difference (D2−D1) is essentially equal to the difference (D1−D0). In the present case the difference between the inner diameter D2 and the rim seat diameter $D_j$ is equal to 1.2 times the tire's section height H.

It can be seen that the upturns 310, 320 of each first and second portion of the carcass reinforcement are respectively engaged between the first and second additional annular structures 21 and 22, so as to ensure good mechanical coupling of the said reinforcement portions.

In this first example the additional annular sidewall structures are positioned on either side of the point F of the sidewall where the tire's width is largest in the section represented.

One of the important points of this configuration is to be able to distribute the forces in the carcass reinforcement between the various annular reinforcement structures such that the circumferential tension forces in each additional sidewall structure is at least equal to 10% of the circumferential force supported by the bead wire when the tire is inflated to working pressure.

Advantageously, the sum of the forces taken up by all the additional reinforcement structures 21, 22 in a sidewall is at least equal to the circumferential forces supported by the bead wire 60.

Thanks to this configuration, a tire can be obtained that has greater transverse rigidity during rolling, which very significantly improves the rolling performances of vehicles fitted with such tires. This solution is particularly advantageous at high speeds.

Figure 2:
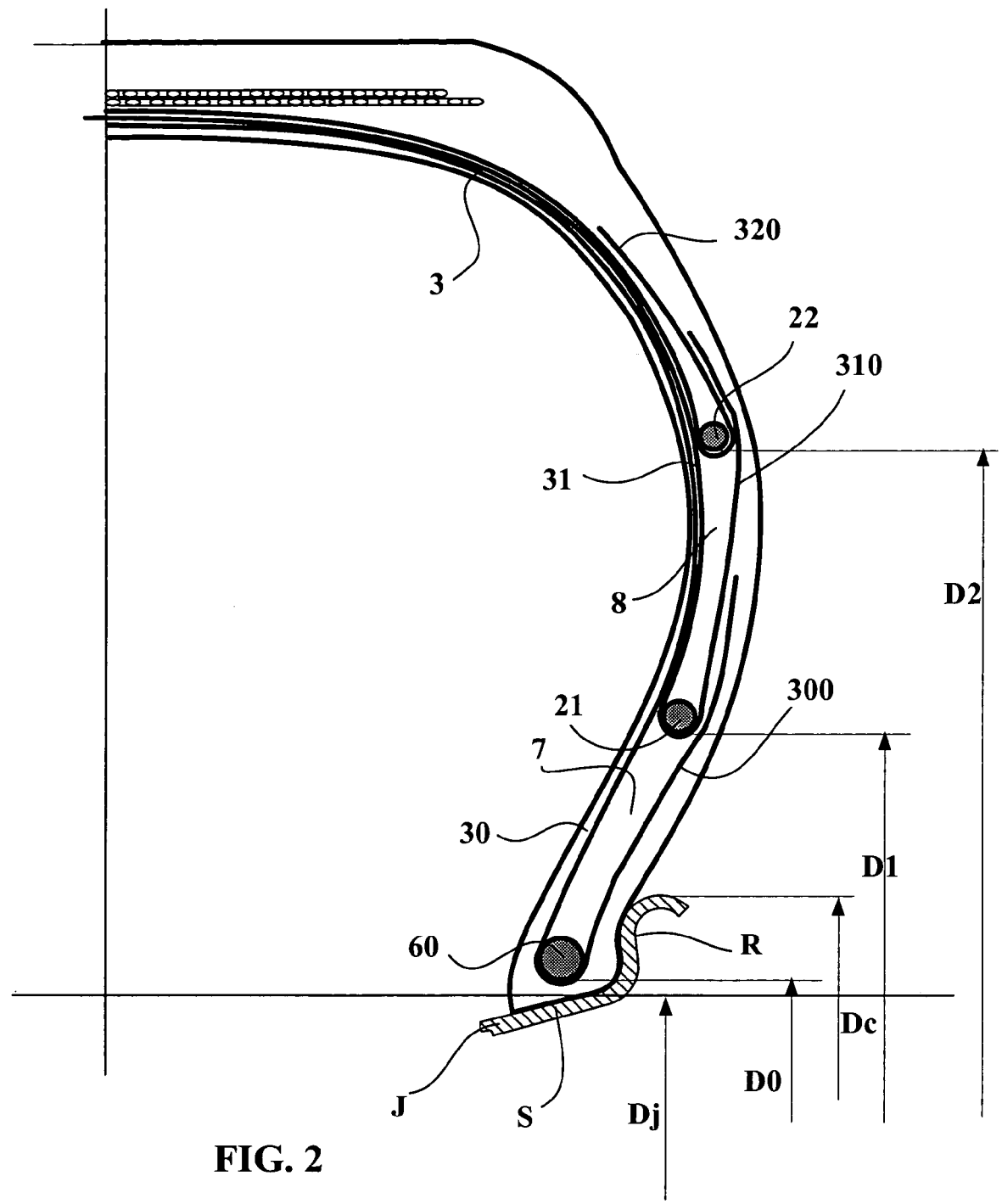
FIGS. 2 to 4 show various variants of tires according to the invention.

In another variant represented in FIG. 2 (for convenience the same indexes are used to denote comparable structural elements) the construction is substantially the same as that shown in FIG. 1 as regards the three portion of the carcass reinforcement (namely three portions anchored on a bead wire 60 and on two additional annular sidewall structures 21 and 22), with the difference that radially beyond the bead wire 60 and radially beyond the sidewall wire 21 radially nearest the rim, are arranged profiled elements 7 and 8 of rubber mix with a Shore A hardness at least equal to 50 and in the present case 80. The height of the profiled element 8, measured in the radial direction, is at least equal to 15 mm and in the present case equal to 20 mm. These profiled elements ensure good mechanical connection between the annular reinforcement structures 60, 21, 22, and greater structural rigidity of the parts of the sidewall concerned.

Besides, the upturns 310 and 320 of the first and second portions 31 and 32 of the carcass reinforcement 3 (anchored respectively on the bead wire and on the sidewall wire radially nearest the rim) follow the axially outer faces of the said profiled elements 7 and 8 before being partially superimposed over the upturn of the portion of the carcass reinforcement that is nearest (respectively 310 and 320).

The sidewall wires 21 and 22 used in the variants of FIGS. 1 and 2 can easily be replaced by any annular structure with a circumferential modulus of extension such that the force taken up by each of the said sidewall rings is at least equal to 10% of the circumferential force exerted on the bead wire.

Figure 3:
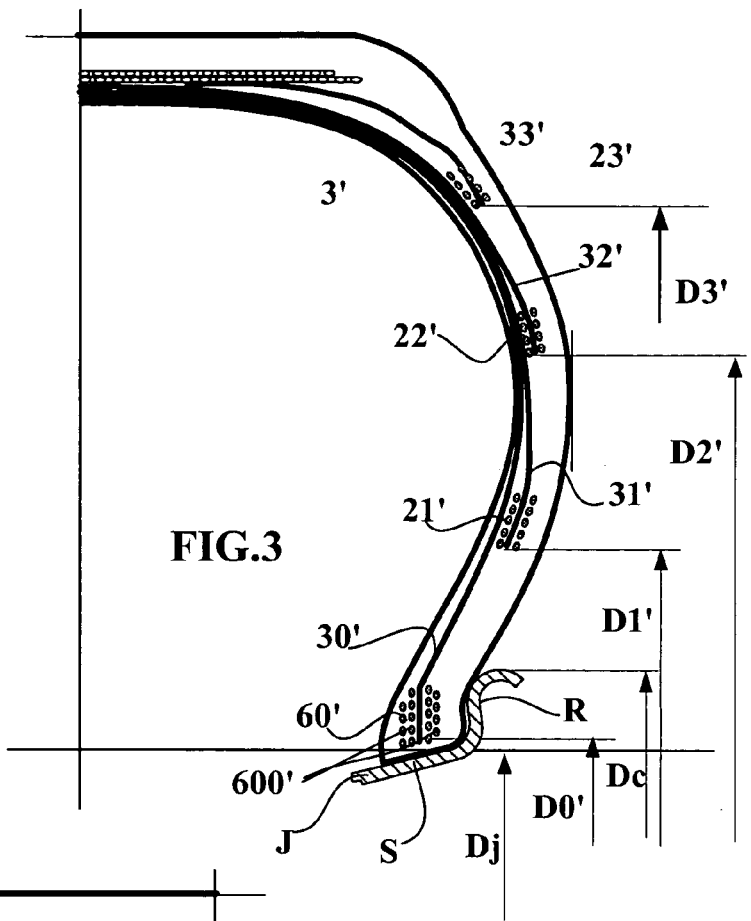
Figure 4:
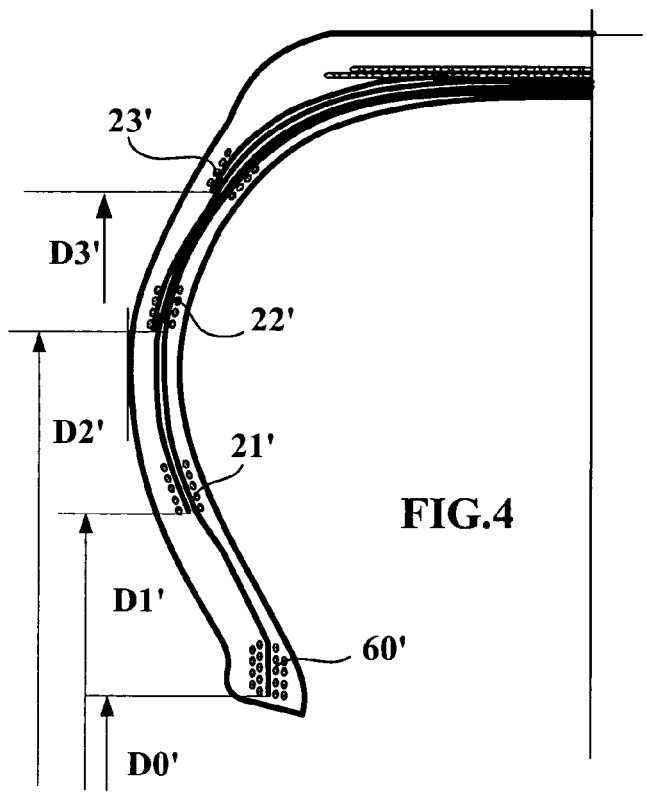

At least one of the annular structures can be replaced by a structure formed of a series of threads or cables wrapped circumferentially to form stacks orientated essentially radially, as shown in the variants of FIGS. 3 and 4.

In FIG. 3 each annular reinforcement structure in the bead 60' and the sidewall 21' and 22' is formed of at least two stacks of metallic cables. A first structure 60' in the bead consists of four stacks 600' enclosing a first portion 30' of the carcass reinforcement 3', this first structure being located radially below the diameter $D_c$ of the flange rim when the tire is mounted on the rim. The inner diameter of this first structure is indexed D0'.

In addition, three other portion 31', 32', 33' of the same carcass reinforcement 3' are each anchored at their end between two stacks of cables wrapped circumferentially. The anchorings of the various carcass portions are formed without upturns.

The inner diameters of the annular reinforcement structures 21', 22', 23', respectively indexed D1', D2', D3' and the diameter D0' of the bead structure 60' are such that the distances between these structures in the cross-section of FIG. 3 are essentially equal.

In the variant of FIG. 4 the stacks of the additional annular sidewall reinforcement structures 21', 22', 23' are positioned axially on either side of all the portions 30', 31', 32', 33' of the carcass reinforcement. For example, the radially outermost annular structure 23', of diameter D3', is formed of the stacks between which the four carcass reinforcement portions pass.

These tire architectures are applicable to tire of all categories, in particular designed for passenger cars and especially high-speed vehicles, but also tires designed for trucks, for two-wheelers, for construction machines, aircraft, etc.

The tires can be fabricated by processes involving fabrication on a core.

The different tire variants shown are mounted on rims whose seats are inclined inwards (i.e. whose axially outermost points are located on a circle of diameter larger than that of the circle on which the axially inner points are located); the person skilled in the art will be able to adapt this invention to tires designed for fitting on rims at least one seat of which is inclined outwards (i.e. whose axially outermost points lie on a circle of diameter smaller than that of the circle on which the axially inner points are located) as defined, for example, in the U.S. Pat. No. 6,092,575. In the case of a tire fitted on a rim whose seats have different diameters, it is advantageous to provide a larger number of annular reinforcements structures for anchoring the carcass in the longer sidewall (i.e. in the sidewall extended by the bead in contact with the rim seat whose diameter is smaller).

In another variant shown schematically in FIG. 10, some reinforcing elements 111 of the same ply 11 forming a carcass reinforcement can be anchored on a first annular structure 40 and other reinforcing elements 112, 113 of the same ply 11 can be anchored respectively on two other annular structures 41 and 42 (the view of FIG. 10 corresponds to a partial view of a sidewall).

Description of the Stages of the Process According to the Invention

FIGS. 5 to 9 show a succession of stages in the fabrication of a tire blank comprising a carcass reinforcement 3 anchored to a bead wire 6 in each bead and to two wires 21, 22 in each of the tire's sidewalls. This fabrication corresponds essentially to that of the tire according to the invention described with reference to FIG. 2.

In a first stage (FIG. 5) a first carcass portion 30 is positioned on a drum (here, only half of the said portion is shown, without explicitly showing the said drum), and then a first profiled element 7 of rubber mix is wrapped on this first portion close to each lateral end of the said portion and then a bead wire 60 of diameter D0 is fitted on concentrically with the drum to come into lateral contact with the said profiled element 7. Then, the end part of this carcass portion is partially turned up around the bead wire 60 while reserving part of the upturn 300 to be overlaid on a second carcass portion in a subsequent stage.

In the next stage (FIG. 6) this first carcass reinforcement portion 30 is assembled with a second portion 31 formed on another drum (or on the same drum after shaping to the desired diameter) in the same way as the said first portion. The second carcass portion 31 comprises part of the carcass reinforcement partially wrapped around a wire 21 of inner diameter D1, itself in lateral contact with a second profiled element of rubber mix 8. Assembly is carried out by slightly shaping the first carcass portion 30 concentrically with the second portion 31 and by bringing the bead wires 60 axially towards one another (towards the median plane marked XX in FIGS. 5 to 9).

The next stage (FIG. 7) is identical to the preceding stage in that a third carcass portion 32 is produced. This third portion 32 is wrapped around a wire 22 of inner diameter D2 and a third profiled element 9 of rubber mix.

In the stage illustrated in FIG. 8 the bead and sidewall wires are brought together towards the median plane of the tire blank, while shaping the blank, for example by internal inflation, using known methods.

Lastly, a tire blank 10 is obtained (FIG. 9) in the form of a torus, with the upturns 300 and 310 of the first and second carcass reinforcement portions overlaid against the rubber profiled elements 7, 8 and 9.

After this, the fabrication of the tire is continued by applying, in a manner known as such, plies of a reinforcement belt and then a tread before placing the blank inside a molding mould and vulcanizing the rubber mixes.

Of course, the invention is not limited to the examples described and illustrated, and various modifications can be made to it without going beyond its scope.

The invention claimed is:

1. A tire designed to be mounted on a mounting rim, the tire comprising:
    two beads designed to cooperate with respective seats of the mounting rim, each of the beads comprising an annular bead reinforcement structure;
    a tread;
    a crown comprising a crown reinforcement structure, the crown being surmounted radially on the outside by the tread;
    on either side of the crown, a sidewall extending from the crown to the respective bead; and
    a carcass reinforcement extending between the beads, passing through the crown and the sidewalls,
    wherein at least one sidewall comprises at least two annular sidewall reinforcement structures, each annular sidewall reinforcement structure having an inner diameter at least equal to a maximum diameter $D_c$ of the mounting rim,
    wherein the carcass reinforcement is anchored at least partially on each annular bead reinforcement structure and on each annular sidewall reinforcement structure,
    wherein the at least two annular sidewall reinforcement structures comprise a radially innermost annular sidewall reinforcement structure and a radially outermost annular sidewall reinforcement structure,
    wherein the difference between the inner diameter of said radially innermost annular sidewall reinforcement structure and a diameter $D_j$ of the seat of the mounting rim on the same side as the sidewall containing the at least two annular sidewall reinforcement structures is at least equal to 20% of the diameter $D_j$, and
    wherein the difference between the inner diameter of said radially outermost annular sidewall reinforcement structure and the diameter $D_j$ is at most equal to 1.6 times a section height H of the tire.

2. The tire of claim 1, wherein every two adjacent annular sidewall reinforcement structures on a same side of the tire are separated by a rubber profiled element whose height, measured in a radial direction of the tire, is at least equal to 15 mm.

3. The tire of claim 1, wherein a circumferential tension force in each sidewall reinforcement structure is at least equal to 10% of a circumferential tension force taken up by the respective annular bead reinforcement structure when the tire is inflated to a working pressure.

4. The tire of claim 3, wherein the sum of the circumferential tension forces taken up by the at least two annular sidewall reinforcement structures is at least equal to the circumferential tension force to which the respective annular bead reinforcement structure is subjected when the tire is inflated to the working pressure.

5. The tire of claim 1, wherein the at least two annular sidewall reinforcement structures and the annular bead reinforcement structures constitute annular reinforcement structures, and wherein each of the annular reinforcement structures comprises a wire to which is anchored a portion of the carcass reinforcement by forming a upturn.

6. The tire of claim 5, wherein at least between two adjacent annular reinforcement structures on a same side of the tire, a rubber profiled element is provided, said profiled element having a Shore A hardness which is at least equal to 50 and is appropriate for ensuring a proper function of the profiled element under compression.

7. The tire of claim 1, wherein the at least two annular sidewall reinforcement structures and the annular bead reinforcement structures constitute annular reinforcement structures, and wherein each of the annular reinforcement structures is composed of a series of threads or cables arranged in a circumferential direction of the tire to form at least one stack which extends radially and to which a portion of the carcass reinforcement is anchored.

8. A tire designed to be mounted on a mounting rim having two seats and a maximum diameter $D_c$, the tire comprising:
    two beads designed to cooperate with the respective seats of the mounting rim, each of the beads comprising an annular bead reinforcement structure;
    a crown comprising a crown reinforcement structure;
    a tread surmounted radially on the crown;
    on either side of the crown, a sidewall extending from the crown to the respective bead; and
    a carcass reinforcement extending between the beads, passing through the crown and the sidewalls,
    wherein at least one sidewall comprises at least two annular sidewall reinforcement structures, each annular sidewall reinforcement structure having an inner diameter at least equal to the maximum diameter $D_c$ of the mounting rim,
    wherein the carcass reinforcement is anchored at least partially on each annular bead reinforcement structure and on each annular sidewall reinforcement structure,
    wherein the difference between the inner diameter of a radially innermost annular sidewall reinforcement structure of the at least two annular sidewall reinforcement structures and a diameter $D_j$ of the seat of the mounting rim on the same side as the sidewall containing said radially innermost annular sidewall reinforcement structure is at least equal to 20% of the diameter $D_j$, and
    wherein every two adjacent annular sidewall reinforcement structures on a same side of the tire are separated by a rubber profiled element whose height, measured in a radial direction of the tire, is at least equal to 15 mm.

9. A tire designed to be mounted on a mounting rim having two seats and a maximum diameter $D_c$, the tire comprising:
    two beads designed to cooperate with the respective seats of the mounting rim, each of the beads comprising an annular bead reinforcement structure;
    a crown comprising a crown reinforcement structure;
    a tread surmounted radially on the crown;
    on either side of the crown, a sidewall extending from the crown to the respective bead; and
    a carcass reinforcement extending between the beads, passing through the crown and the sidewalls;
    wherein at least one sidewall comprises at least two annular sidewall reinforcement structures, each annular sidewall reinforcement structure having an inner diameter at least equal to the maximum diameter $D_c$ of the mounting rim, wherein the carcass reinforcement is anchored at least partially on each annular bead reinforcement structure and on each annular sidewall reinforcement structure, wherein the difference between the inner diameter of a radially innermost annular sidewall reinforcement structure of the at least two annular sidewall reinforcement structures and a diameter $D_j$ of the seat of the mounting rim on the same side as the sidewall containing said radially innermost annular sidewall reinforcement structure is at least equal to 20% of the diameter $D_j$, wherein the at least two annular sidewall reinforcement structures and the annular bead reinforcement structures constitute annular reinforcement structures, each of the annular reinforcement structures comprising a wire to which a portion of the carcass reinforcement is anchored, and wherein at least two adjacent annular reinforcement structures on a same side of the tire is separated by a rubber profiled element, said profiled element having a Shore A hardness which is at least equal to 50 and is appropriate for ensuring a proper function of the profiled element under compression.

* * * * *